(12) United States Patent
Kane

(10) Patent No.: US 7,290,562 B2
(45) Date of Patent: Nov. 6, 2007

(54) NON-RETURN VALVE

(75) Inventor: Brian J. Kane, Budenheim (DE)

(73) Assignee: Bosch Rexroth AG, Stuttgart (DE)

( * ) Notice: Subject to any disclaimer, the term of this patent is extended or adjusted under 35 U.S.C. 154(b) by 0 days.

(21) Appl. No.: 10/549,597

(22) PCT Filed: Mar. 19, 2004

(86) PCT No.: PCT/DE2004/000578

§ 371 (c)(1),
(2), (4) Date: Oct. 5, 2005

(87) PCT Pub. No.: WO2004/083696

PCT Pub. Date: Sep. 30, 2004

(65) Prior Publication Data

US 2006/0196553 A1  Sep. 7, 2006

(30) Foreign Application Priority Data

Mar. 20, 2003 (DE) .................... 103 12 530
Apr. 9, 2003 (DE) .................... 103 16 230

(51) Int. Cl.
*F16K 15/02* (2006.01)

(52) U.S. Cl. .............. 137/538; 137/540; 251/337; 251/358

(58) Field of Classification Search .......... 137/538, 137/540, 543.23; 251/358, 368
See application file for complete search history.

(56) References Cited

U.S. PATENT DOCUMENTS

| 2,755,816 | A | * | 7/1956 | Collins ................. 137/496 |
| 2,930,401 | A | * | 3/1960 | Cowan ................. 137/540 |
| 3,099,999 | A | * | 8/1963 | Vismara ............... 137/543.23 |
| 3,315,696 | A | * | 4/1967 | Hunter ................. 137/244 |
| 3,457,949 | A | | 7/1969 | Coulter |
| 3,770,009 | A | | 11/1973 | Miller |
| 3,801,233 | A | | 4/1974 | Simpson |
| 4,695,602 | A | * | 9/1987 | Crosby et al. ............. 524/439 |
| 5,092,361 | A | * | 3/1992 | Masuyama et al. .... 137/543.21 |
| 5,613,518 | A | | 3/1997 | Rakieski |
| 2001/0018930 | A1 | | 9/2001 | Katsura |
| 2001/0039966 | A1 | | 11/2001 | Walpole et al. |

FOREIGN PATENT DOCUMENTS

EP    1 132 668 A2    9/2001

OTHER PUBLICATIONS

RD 20 395/12.95.
English Language Translation of Chinese Office Action.

* cited by examiner

*Primary Examiner*—Ramesh Krishnamurthy
(74) *Attorney, Agent, or Firm*—Oliff & Berridge, PLC

(57) ABSTRACT

What is disclosed is a non-return valve comprising a sealing piston which is biased against a valve seat in the basic position inside a valve housing, and which is manufactured by a plastics injection molding technique.

20 Claims, 1 Drawing Sheet

NON-RETURN VALVE

BACKGROUND

The invention relates to a non-return valve in accordance with the preamble of claim 1.

Non-return valves have the function of blocking a pressure medium flow in one direction and admit a volume flow in the opposite direction.

A like non-return valve is disclosed in the applicant's data sheets RD 20 395/12.95. There, a metallic sealing piston adapted to allow a flow therethrough is received in a valve housing and is in a basic position biased against a valve seat, so that a pressure medium connection between two working ports is blocked in the direction of flow therethrough.

It is a drawback of the known solution that the complexity in manufacturing the metallic sealing piston is very high.

Moreover it is a drawback in the known solution that it has a strong tendency to sealing defects.

Moreover it is disadvantageous that the metallic sealing piston is heavy, so that the non-return valve exhibits relatively sluggish response characteristic.

SUMMARY

It is an object of the present invention to furnish a non-return valve that eliminates the above mentioned drawbacks and may be manufactured at a low cost.

This object is attained through a non-return valve having the features in accordance with claim 1.

In accordance with the invention, a sealing piston of a non-return valve is manufactured by a plastics injection molding technique. It is an advantage of this solution that the sealing piston in accordance with the invention may be manufactured with little complexity and in a cost-efficient manner. Moreover the plastics surface of the sealing piston of the invention is relatively soft, so that a good tightness may be ensured. Moreover the sealing piston of the invention is characterized by a low weight, so that the non-return valve exhibits sensitive response characteristics.

A preferred plastics material is poly-ether-ether-ketone (PEEK) in which carbon fiber, preferably in a proportion of 30%, may be integrated so as to enhance stiffness of the sealing piston.

The sealing piston is guided on the drain side, with recesses being provided in its outer periphery so as to reduce hysteresis. Between the recesses, axial webs are preferably left, the guide surfaces of which are wetted by the pressure medium in the spring chamber, to thus permit optimum guiding of the sealing piston. In one embodiment, six recesses with six intermediate webs are provided.

In the opened position, pressure medium may flow into the spring chamber via a star configuration of bores. In order to improve guiding of the sealing piston, and for reinforcement, guide projections may be formed between the bores of the star configuration of bores. The guide projections are preferably triangular and taper in an upstream direction against the direction of pressure build-up, with their axial length preferably corresponding to the inner diameter of the bores. The inner diameter and number of the bores are selected with a view to a respective optimum cross-section of flow. Preferably four bores are provided.

In order to avoid a generation of turbulences of the pressure medium flow in the opened position, the sealing piston may have a front-side flow-receiving cone on the supply side. The flow-receiving cone may have a rounded or hemispherical head.

A spring for biasing the sealing piston is in one preferred embodiment supported on a spring cup, equally made of plastics, in the basic position. Preferably the spring cup has on its outer periphery at least one radial sealing lip, so that the spring chamber is closed sealingly. Moreover at least one sealing lip may be formed on the front side on the spring cup. Particularly good sealing properties are obtained if the radial sealing lips are inclined opposite to the direction of pressure build-up, and the front-side sealing lips are inclined in the direction of pressure build-up.

Other advantageous embodiments are the subject matter of further subclaims.

BRIEF DESCRIPTION OF THE DRAWINGS

In the following a detailed explanation of a preferred embodiment of the invention will be given by referring to schematic representations, wherein.

EMBODIMENTS

Figure 1:
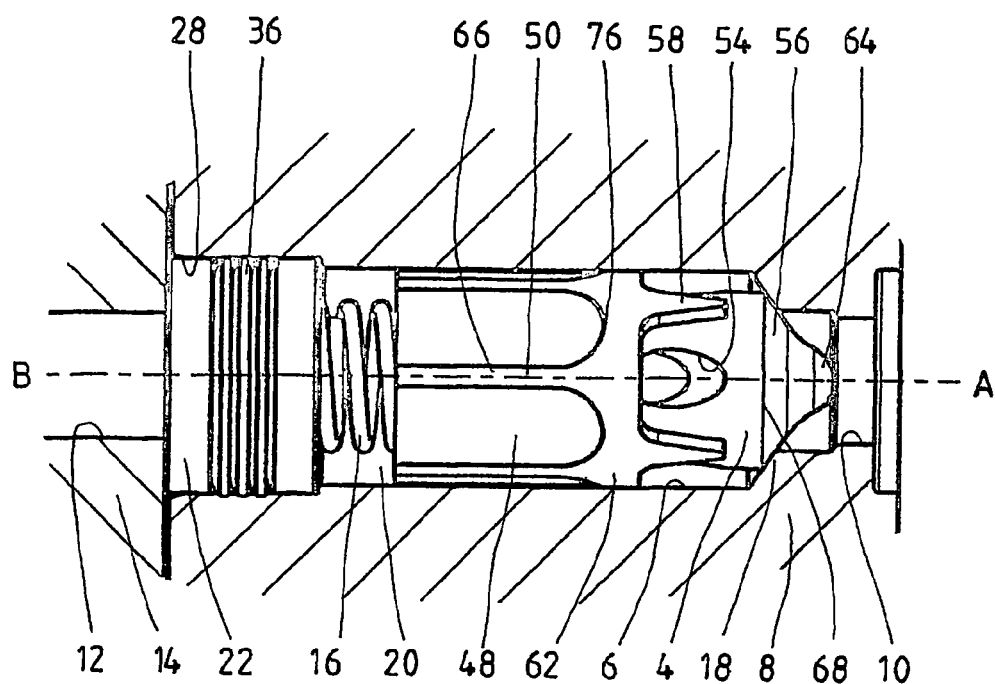
FIG. 1 is a lateral view of an embodiment of a non-return valve in accordance with the invention.
Figure 2:
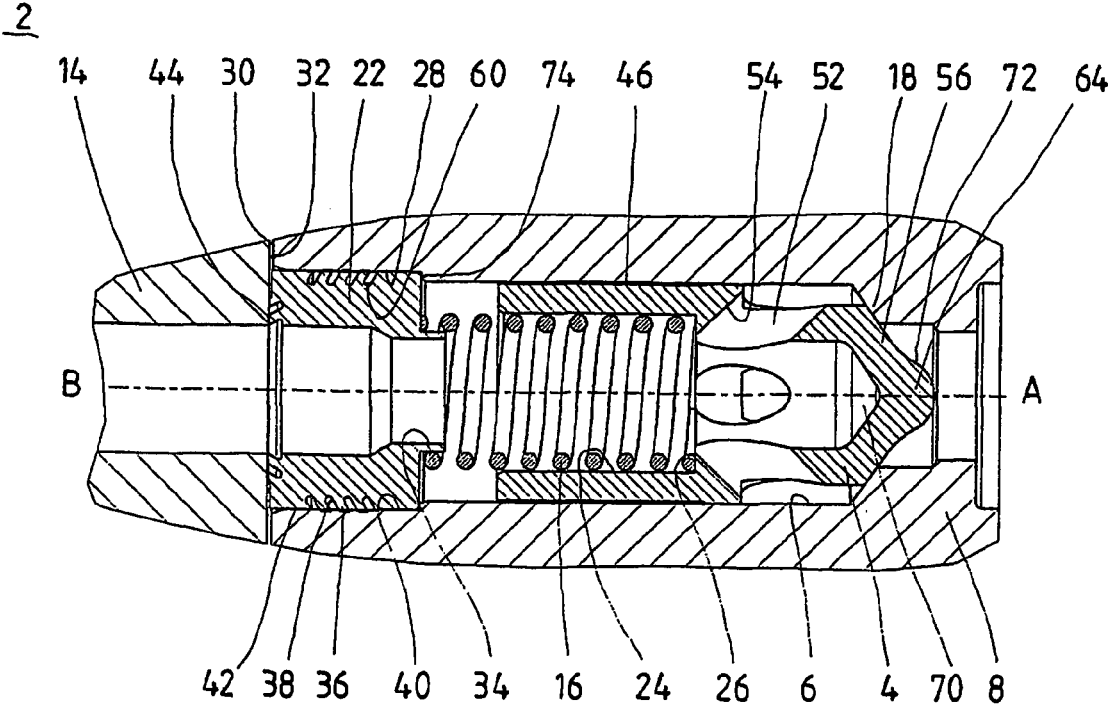
FIG. 2 is a longitudinal sectional view of the non-return valve of FIG. 1.

FIGS. 1 and 2 show a lateral view of a preferred embodiment of a directly controlled non-return valve 2 in accordance with the invention, and an enlarged longitudinal sectional view including a sealing piston 4 adapted for a flow therethrough, which is received in a longitudinal bore 6 of a valve housing 8. The longitudinal bore 6 extends between a coaxial connection bore 10 for connection of a supply-side working port A and a coaxial connection bore 12 of a coupling plate 14 of a drain-side working port which closes the longitudinal bore 6. In its basic position, the sealing piston 4 is biased by a spring 16 against a valve seat 18. The spring 16 is arranged in a spring chamber 20 and supported on a spring cup 22 in the longitudinal bore 6. It plunges into a reception bore 24 of the sealing piston 4 (FIG. 2) and attacks on an annular bottom surface 26 of the reception bore 24.

The sealing piston 4 is in accordance with the invention manufactured by an injection molding technique. It consists of plastics and may be reinforced with carbon fiber. Preferably the selected plastics is poly-ether-ether-ketone (PEEK) and reinforced with 30% of carbon fiber. The sealing piston 4 is executed in the form of a hollow piston, with the reception bore 24 being radially tapered in the direction of a flow-receiving side 68 of the sealing piston 4. Bores 54 of a star configuration of bores 52 merge into this taper 70. In the opened position, pressure medium may thus enter into the sealing piston 4 via the valve seat 18 through the bores 54 and flow into the spring chamber 20 on the rear chamber side. In order to improve the flow characteristics, the bores 54 obliquely merge into the taper 70 in the direction of pressure build-up. The shape and number of bores 54 is selected such that the cross-section of flow of the bores 54 is optimized. Preferably four bores 54 are provided.

In order to homogenize the pressure medium flow, a flow-receiving cone 56 is formed on the flow-receiving side 68 of the sealing piston 4. The flow-receiving cone 56 continues into a hemispherical head 64, with the peripheral surface 72 of the head 64 being inclined more steeply than the one of the flow-receiving cone 56.

The sealing piston 4 is radially guided in the longitudinal bore 6 on the drain side, with a multiplicity of radial recesses 48 being provided in its outer periphery 46 so as to avoid one-sided guidance of the sealing piston 4 in the longitudinal bore 6 and thus reduce hysteresis, so that the sealing piston 6 is guided through the intermediary of single axial webs 50 separating the recesses 48 from each other, and a narrow annular collar 62 at the bottom 76 of the recesses 48.

The pocket-type recesses 48 are open towards the spring chamber 20 and extend in the manner of fingers in a direction towards the flow-receiving cone 56. The number of recesses 48 is optimized with regard to the width of the peripheral guide surfaces 66 of the webs 50. Preferably six recesses 48 with six webs 50 are provided.

The annular collar 62 continues in an upstream direction towards the flow-receiving cone 56 into axial triangular guide projections 58. The guide projections 58 extend between the bores 54 and taper in a direction towards the flow-receiving cone 56. The axial length of the guide projections 58 is preferentially selected such that it about corresponds to the inner diameter of the bores 54. In the range of the guide projections 56, the sealing piston 4 has the same outer diameter as in the range of the annular collar 62 and in the range of the webs 50, so that the sealing piston 4 is equally guided in the longitudinal bore 6 through the intermediary of the guide projections 58 and thus the axial length of guidance is correspondingly extended by the axial extent of the guide projections 58. As a result of arranging the guide projections 58 between the bores 54, this range of the sealing piston 4 that is structurally weakened by the bores 54 is additionally reinforced.

The spring cup 22 is manufactured of a plastics material that is preferentially softer than the plastics of the sealing piston 4. It is inserted in a radial undercut 28 of the longitudinal bore 8 and axially immobilized in its position through contact with the coupling plate 14. The axial length of the undercut 28 is selected such that opposite surfaces 30, 32 of the coupling plate 14 and of the valve housing 8 are spaced apart in the assembled condition, and the coupling plate 14 is only taken into contact with the spring cup 22, so that the latter is pushed against a shoulder 74 of the undercut 28. In order to allow draining of the pressure medium from the spring chamber 20, a through bore 34 coaxial with the longitudinal bore 6 of the valve housing 8 and with the connection bore 12 of the coupling plate 14 is formed in the spring cup 22.

At the outer periphery 42 of the spring cup 22, radial sealing lips 36 for sealing the spring chamber 20 against the coupling plate 14 are provided. The sealing lips 36 extend in parallel and are formed by annular grooves 38. The sealing lips 36 extend obliquely to the longitudinal axis of the longitudinal bore 6, and are inclined against the direction of pressure build-up in a direction towards the valve seat 18 when viewed from groove bottoms 60 of the annular grooves 38. This oblique orientation in combination with the soft plastics has the advantage that the sealing lips 36 are automatically straightened up or inclined as a result of the pressure medium and thus are pushed against the inner periphery 40 of the undercut 32 of the longitudinal bore 6. For sealing the drain-side connection bore 12 of the coupling plate 14, there is provided on the front side at least one sealing lip 44 inclined obliquely relative to the longitudinal bore 6, however in contrast with the radial sealing lips 36 inclined in the direction of pressure build-up, so that they may be inclined or straightened up by the pressure of the draining pressure medium.

By manufacturing the sealing piston 4 by a plastics injection molding technique, complexity of manufacture is thus substantially reduced, and the sealing piston 4 may accordingly be manufactured at low cost and rapidly.

Moreover good sealing may be obtained through the fact that owing to the relatively soft plastics surface of the sealing piston 4, pollutions from the pressure medium that are deposited, e.g., on the valve seat 18 may be impressed into the sealing piston 4.

Thanks to the use of plastics in accordance with the invention, the sealing piston 4 may be executed substantially more easily than known metallic sealing pistons, so that the non-return valve 4 of the invention exhibits improved response characteristics. These response characteristics are additionally improved by the recesses 48 in the outer periphery 46 of the sealing piston 4, wherein the axial guiding length of the webs 50 of the sealing piston 4 is prolonged by the guide projections 58. Moreover the response characteristics of the non-return valve 2 of the invention are improved by the flow-receiving cone 56, for the pressure medium may have an optimum flow onto the sealing piston 4 and may in the opened position flow off better across the valve seat 18.

It is obvious that even though the above described embodiment shows a non-return valve having two axial working ports, the sealing piston 4 of the invention may also be employed in non-return valves having one axial and one radial working port.

What is disclosed is a non-return valve comprising a sealing piston which is biased against a valve seat in the basic position inside a valve housing, and which is manufactured by a plastics injection molding technique.

LIST OF REFERENCE NUMERALS 2 non-return valve
4 sealing piston
6 longitudinal bore
8 valve housing
10 connection bore
12 connection bore
14 coupling plate
16 spring
18 valve seat
20 spring chamber
22 spring cup
24 reception bore
26 bottom surface
28 undercut
30 surface
32 surface
34 through bore
36 sealing lip
38 annular grooves
40 inner periphery
42 outer periphery
44 sealing lip
46 outer periphery
48 recesses
50 web
52 star configuration of bores
54 bores
56 flow-receiving cone
58 guide projection
60 groove bottom
62 annular collar
64 head
66 guide surface
68 flow-receiving side
70 taper
72 peripheral surface
74 shoulder
76 bottom

The invention claimed is:

1. A non-return valve comprising:
a hollow sealing piston received in a valve housing and biased against a valve seat by means of a spring in a basic position, so that in the basic position a pressure medium connection between two working ports in a direction of flow therethrough is closed; and
wherein the sealing piston is manufactured by a plastics injection molding technique;
wherein the sealing piston includes a star configuration of bores, through the bores of which a pressure medium may flow into a spring chamber in an opened position; and
wherein guide projections are formed between the bores, which guide projections have a triangular shape and taper in a flow-receiving direction.

2. The non-return valve in accordance with claim 1, wherein the sealing piston is manufactured of a plastics material PEEK.

3. The non-return valve in accordance with claim 1, wherein the sealing piston is reinforced by 30% of carbon fiber.

4. The non-return valve in accordance with claim 1, wherein the sealing piston includes a multiplicity of recesses on an outer periphery, so that the sealing piston is guided in a longitudinal bore by axial webs delimiting the recesses from each other.

5. The non-return valve in accordance with claim 4, wherein six recesses and four bores are provided.

6. The non-return valve in accordance with claim 1, wherein the sealing piston comprises a flow-receiving cone.

7. The non-return valve in accordance with claim 6, wherein the flow-receiving cone has a rounded head.

8. A non-return valve comprising:
a hollow sealing piston received in a valve housing and biased against a valve seat by means of a spring in a basic position, so that in the basic position a pressure medium connection between two working ports in a direction of flow therethrough is closed; and
wherein the sealing piston is manufactured by a plastics injection molding technique;
wherein the sealing piston includes a star configuration of bores, through the bores of which a pressure medium may flow into a spring chamber in an opened position; and
wherein guide projections are formed between the bores, the guide projections having an axial length approximately corresponding to inner diameters of the bores; and
wherein the sealing piston is adapted for a flow therethrough and includes a multiplicity of recesses on an outer periphery, so that the sealing piston is guided in a longitudinal bore by axial webs delimiting the recesses from each other;
wherein the guide projections extend forward, to between the star configuration of bores, from an annular collar of the sealing piston; and
wherein the axial webs extend rearward from the annular collar.

9. The non-return valve in accordance with claim 8, wherein the sealing piston is manufactured of a plastics material PEEK.

10. The non-return valve in accordance with claim 8, wherein the sealing piston is reinforced by 30% of carbon fiber.

11. The non-return valve in accordance with claim 8, wherein six recesses and four bores are provided.

12. The non-return valve in accordance with claim 8, wherein the sealing piston comprises a flow-receiving cone.

13. The non-return valve in accordance with claim 12, wherein the flow-receiving cone has a rounded head.

14. A non-return valve comprising:
a hollow sealing piston received in a valve housing and biased against a valve seat by means of a spring in a basic position, so that in the basic position a pressure medium connection between two working ports in a direction of flow therethrough is closed; and
wherein the sealing piston is manufactured by a plastics injection molding technique;
wherein the spring is supported in the valve housing by a spring cup made of plastics;
wherein the spring cup has at its outer periphery and/or on its front side at least one sealing lip;
wherein the spring cup further includes radial sealing lips that are inclined against a direction of pressure build-up; and
wherein front-side sealing lips are inclined in the direction of pressure build-up.

15. The non-return valve in accordance with claim 14, wherein the sealing piston is manufactured of a plastics material PEEK.

16. The non-return valve in accordance with claim 14, wherein the sealing piston is reinforced by 30% of carbon fiber.

17. The non-return valve in accordance with claim 14, wherein the sealing piston includes a multiplicity of recesses on an outer periphery, so that the sealing piston is guided in a longitudinal bore by axial webs delimiting recesses from each other.

18. The non-return valve in accordance with claim 17, wherein six recesses and four bores are provided.

19. The non-return valve in accordance with claim 14, wherein the sealing piston comprises a flow-receiving cone.

20. The non-return valve in accordance with claim 19, wherein the flow-receiving cone has a rounded head.

* * * * *